US010133096B2

(12) United States Patent
Zhu et al.

(10) Patent No.: US 10,133,096 B2
(45) Date of Patent: Nov. 20, 2018

(54) ARRAY SUBSTRATE, DISPLAY PANEL, DISPLAY APPARATUS, AND METHOD FOR PRODUCING ARRAY SUBSTRATE

(71) Applicant: BOE Technology Group Co., Ltd., Beijing (CN)

(72) Inventors: Ming Zhu, Beijing (CN); Teruaki-Suzuki, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 15/126,704

(22) PCT Filed: Oct. 16, 2015

(86) PCT No.: PCT/CN2015/092076
§ 371 (c)(1),
(2) Date: Sep. 16, 2016

(87) PCT Pub. No.: WO2017/000426
PCT Pub. Date: Jan. 5, 2017

(65) Prior Publication Data
US 2018/0031871 A1 Feb. 1, 2018

(30) Foreign Application Priority Data

Jun. 30, 2015 (CN) .......................... 2015 1 0372793

(51) Int. Cl.
*G02F 1/01* (2006.01)
*G02B 1/14* (2015.01)
(Continued)

(52) U.S. Cl.
CPC ............. *G02F 1/0131* (2013.01); *G02B 1/04* (2013.01); *G02B 1/10* (2013.01); *G02B 1/14* (2015.01);
(Continued)

(58) Field of Classification Search
CPC ..... G02F 1/13363; G02F 2001/133635; G02F 1/0131; G02B 1/14; G02B 5/3038; B29D 11/00644
(Continued)

(56) References Cited

U.S. PATENT DOCUMENTS 8,139,181 B2  3/2012  Yoshihara et al.
8,659,728 B2  2/2014  Kimura
(Continued)

FOREIGN PATENT DOCUMENTS

CN     1512217 A    7/2004
CN   101460306 A    6/2009
(Continued)

OTHER PUBLICATIONS

International Search Report and Written Opinion, including English translation of Box No. V of the Written Opinion, for the International Application No. PCT/CN2015/092076, dated Mar. 28, 2016, 12 pages.
(Continued)

*Primary Examiner* — Marin Pichler
(74) *Attorney, Agent, or Firm* — Westman, Champlin & Koehler, P.A.

(57) ABSTRACT

The present invention provides an array substrate comprising a transparent substrate and a polarizer attached on the transparent substrate, the polarizer comprises a first protective layer in contact with the transparent substrate, and a relational expression is satisfied between the first protective layer and the transparent substrate, $0 \leq |C| \leq 1.0 \times 10^{-13}$, wherein C is defined by the equation $$C = \frac{C_{100}\rho_{100}d_{100}}{\rho_{100}d_{100} + \rho_{200}d_{200}} + \frac{C_{200}\rho_{200}d_{200}}{\rho_{100}d_{100} + \rho_{200}d_{200}}.$$

When designing an array substrate provided by this invention, it is not required to consider the improvement of the material of the polarizer, and it may be ensured that the change of photoelastic birefringence of a finally formed array substrate is zero (or close to zero) in the case of being
(Continued)

subjected to stress by only adjusting the thickness of a first protective layer or the material of the first protective layer, such that the phenomenon of light leakage of a finally formed liquid crystal display panel generated due to photoelastic birefringence may be eliminated or reduced. This invention further provides a display panel, a display apparatus, and a method for producing an array substrate.

13 Claims, 3 Drawing Sheets

(51) Int. Cl.
- *G02F 1/13363* (2006.01)
- *G02F 1/335* (2006.01)
- *G02B 1/04* (2006.01)
- *G02B 1/10* (2015.01)
- *G02F 1/1335* (2006.01)

(52) U.S. Cl.
CPC .... *G02F 1/13363* (2013.01); *G02F 1/133528* (2013.01); *G02F 1/133533* (2013.01)

(58) Field of Classification Search
USPC .................. 359/489.01, 489.02, 489.03; 349/117–120, 158, 96, 489.01, 489.02, 349/489.03
See application file for complete search history.

(56) References Cited

U.S. PATENT DOCUMENTS

| | | | |
|---|---|---|---|
| 8,822,614 | B2 | 9/2014 | Yonemura et al. |
| 2006/0270084 | A1 | 11/2006 | Kimura |
| 2008/0095999 | A1 | 4/2008 | Yoshihara et al. |
| 2009/0244445 | A1* | 10/2009 | Nakamura ............ B29C 43/222 349/96 |
| 2014/0327861 | A1 | 11/2014 | Huang et al. |
| 2015/0055062 | A1* | 2/2015 | Hisakado ............ G02F 1/13363 349/96 |

FOREIGN PATENT DOCUMENTS

| | | |
|---|---|---|
| CN | 102455455 A | 5/2012 |
| CN | 102906130 A | 1/2013 |
| CN | 104880857 A | 9/2015 |
| JP | 2004-246338 A | 9/2004 |
| JP | 2014-115538 A | 6/2014 |
| KR | 20060116138 A | 11/2006 |

OTHER PUBLICATIONS

First Office Action from Chinese Patent Application No. 201510372793. 4, dated Jun. 30, 2017, 6 pages.

* cited by examiner

ARRAY SUBSTRATE, DISPLAY PANEL, DISPLAY APPARATUS, AND METHOD FOR PRODUCING ARRAY SUBSTRATE

CROSS-REFERENCE TO RELATED APPLICATION

This application is a Section 371 National Stage Application of International Application No. PCT/CN2015/092076, filed 16 Oct. 2015, which has not yet published, and claims priority to Chinese Patent Application No. 201510372793.4, filed on Jun. 30, 2015, entitled with "ARRAY SUBSTRATE, DISPLAY PANEL, DISPLAY APPARATUS, AND METHOD FOR PRODUCING ARRAY SUBSTRATE" in the State Intellectual Property Office of China, the disclosures of which are incorporated herein by their reference.

TECHNICAL FIELD

This invention relates to the field of display apparatus, and particularly to an array substrate, a display panel comprising the array substrate, a display apparatus comprising the display panel, and a method for producing an array substrate.

BACKGROUND ART

Birefringence refers to a phenomenon that a beam is separated into two beams refracted along different directions in an anisotropic crystal after incidence, and the two separated beams are linearly polarized lights with vibration directions vertical to each other. Birefringence of an optical polymer mainly includes orientation birefringence and photoelastic birefringence. Here, photoelastic birefringence is birefringence generated by elastic deformation of a polymer. In use of an optical member, if the temperature of the optical member changes, then the volume of the optical member will shrink, and therefore elastic deformation occurs in the material and the elastic deformation of the material will lead to photoelastic birefringence.

In production and use of a liquid crystal display panel, it will be subjected to the action of stress to allow the liquid crystal display panel to generate elastic deformation. Therefore, the photoelastic birefringence index of the liquid crystal display panel will change so as to result in the generation of the phenomenon of light leakage.

In the prior art, it is typical to reduce the birefringence of an optical resin by changing the orientation of the main chain of the resin material from which a polarizer or a protective layer of a liquid crystal display panel is formed, or by eliminating elastic deformation. However, this will greatly reduce production efficiency.

Therefore, how to eliminate optical birefringence by a simple method becomes a technical problem urgent to be solved in the art.

SUMMARY OF THE INVENTION

An object of this invention is to provide an array substrate, a display panel comprising the array substrate, a display apparatus comprising the display panel, and a method for producing an array substrate. The array substrate does not have optical birefringence.

In order to achieve the object described above, as an aspect of this invention, there is provided an array substrate comprising a transparent substrate and a polarizer which is attached on the transparent substrate and comprises a first protective layer in contact with the transparent substrate, wherein the first protective layer and the transparent substrate satisfy the following relational expression:

$$0 \le |C| \le 1.0 \times 10^{-13}$$

in which C is a comprehensive photoelastic coefficient, and is defined by the following equation (1):

$$C = \frac{C_{100}\rho_{100}d_{100}}{\rho_{100}d_{100} + \rho_{200}d_{200}} + \frac{C_{200}\rho_{200}d_{200}}{\rho_{100}d_{100} + \rho_{200}d_{200}} \quad (1)$$

in which $C_{100}$ is the photoelastic coefficient of the transparent substrate, wherein $C_{100}$ may have a first predetermined value;

$\rho_{100}$ is the density of the transparent substrate, wherein $\rho_{100}$ may have a second predetermined value;

$d_{100}$ is the thickness of the transparent substrate, wherein $d_{100}$ may have a third predetermined value;

$C_{200}$ is the photoelastic coefficient of the first protective layer;

$\rho_{200}$ is the density of the first protective layer; and $d_{200}$ is the thickness of the first protective layer.

Preferably, C=0.

Preferably, the thickness of the first protective layer may be not greater than a fourth predetermined value, and the material, from which the first protective layer is produced, is a mixture of a matrix material and an additive such that the photoelastic coefficient of the first protective layer satisfies the relational expression.

Preferably, the matrix material is cellulose triacetate or a cycloolefin copolymer, and the additive is any one of methyl methacrylate, trifluoroethyl methacrylate, trichloroethyl methacrylate, benzyl methacrylate, trimethylcyclohexyl methacrylate, and pentafluorophenyl methacrylate.

Preferably, the transparent substrate has a photoelastic coefficient of $(0.5-3) \times 10^{-12}$ $Pa^{-1}$.

Preferably, the polarizer further comprises a second protective layer and a polarizing layer sandwiched between the first protective layer and the second protective layer, and the material of the polarizing layer is polystyrene-modified cellulose triacetate or a cycloolefin copolymer.

Preferably, the transparent substrate has a thickness of 100 to 300 μm and the first protective layer has a thickness of 65 to 85 μm.

In another aspect of this invention, there is provided a display panel comprising the above-mentioned array substrate provided by this invention.

Preferably, the array substrate comprises a pixel circuit, and the pixel circuit is provided on a surface of the transparent substrate where the first protective layer is not provided.

Preferably, the array substrate comprises a color filter layer, and the color filter layer is provided on a surface of the transparent substrate where the first protective layer is not provided.

In still another aspect of this invention, there is provided a display apparatus comprising the above-mentioned display panel provided by this invention.

In still another aspect of this invention, there is provided a method for producing an array substrate comprising a transparent substrate and a polarizer attached on the transparent substrate, comprising:

providing a transparent substrate, which has a photoelastic coefficient of $C_{100}$, a density of $\rho_{100}$, and a thickness of $d_{100}$;

providing a polarizer on the transparent substrate, wherein the polarizer comprises a first protective layer in contact with the transparent substrate, wherein a photoelastic coefficient $C_{200}$, a density $\rho_{200}$, and a thickness $d_{200}$ of the first protective layer are set so as to satisfy a relational expression $0 \leq |C| \leq 1.0 \times 10^{-13}$, in which C is a comprehensive photoelastic coefficient, and is defined by the following equation (1):

$$C = \frac{C_{100}\rho_{100}d_{100}}{\rho_{100}d_{100} + \rho_{200}d_{200}} + \frac{C_{200}\rho_{200}d_{200}}{\rho_{100}d_{100} + \rho_{200}d_{200}}. \quad (1)$$

Preferably, a photoelastic coefficient $C_{200}$, a density $\rho_{200}$, and a thickness $d_{200}$ of the first protective layer are set such that C=0.

Preferably, the photoelastic coefficient $C_{200}$ and the density $\rho_{200}$ of the first protective layer are predetermined, while the thickness $d_{200}$ thereof is determined by the predetermined photoelastic coefficient $C_{200}$ and the density $\rho_{200}$ according to the relational expression.

Preferably, the thickness $d_{200}$ of the first protective layer is predetermined, while the photoelastic coefficient $C_{200}$ and the density $\rho_{200}$ are determined by the predetermined thickness $d_{200}$ according to the relational expression.

More preferably, the material from which the first protective layer is produced is a mixture of a matrix material and an additive, and the first protective layer having the determined photoelastic coefficient $C_{200}$ and the density $\rho_{200}$ is obtained by adjusting the composition of the mixture.

Still more preferably, the matrix material is cellulose triacetate or a cycloolefin copolymer, and the additive is any one of methyl methacrylate, trifluoroethyl methacrylate, trichloroethyl methacrylate, benzyl methacrylate, trimethylcyclohexyl methacrylate, and pentafluorophenyl methacrylate.

When designing an array substrate provided by this invention, it is not required to consider the improvement of the material of the polarizer, and it may be ensured that the change of photoelastic birefringence of a finally formed array substrate is zero (or close to zero) in the case of being subjected to stress by only adjusting the thickness of a first protective layer or the material of the first protective layer, such that the phenomenon of light leakage of a finally formed display panel generated due to photoelastic birefringence may be eliminated or reduced.

BRIEF DESCRIPTION OF THE DRAWINGS

The accompanying drawing is intended to provide further understanding of this invention, and constitutes a part of the specification, and is used for explaining this invention together with particular embodiments below. However, it does not constitute the limitation of this invention. In the drawing.

DESCRIPTION OF REFERENCE NUMERALS

Figure 2:
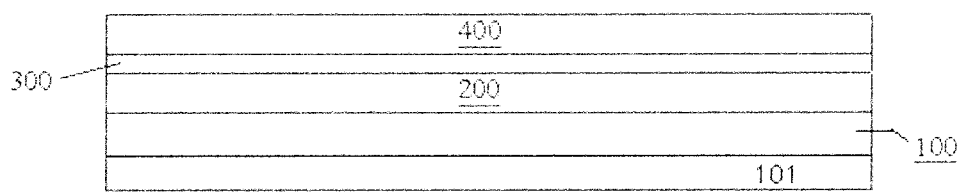
Figure 3:
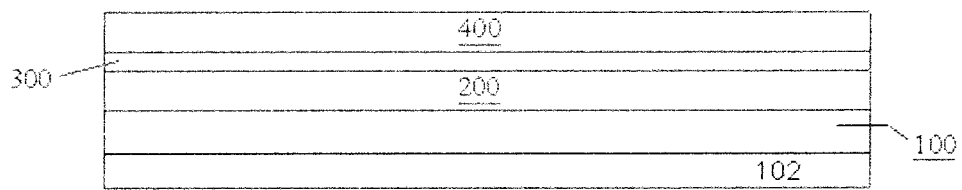

100: transparent substrate 200: first protective layer
300: polarizing layer 400: second protective layer
FIG. 2 shows an embodiment of the disclosure, in which the array substrate comprises a pixel circuit 101, FIG. 3 shows an embodiment of the disclosure, in which the array substrate comprises a color filter layer 102.

DESCRIPTION OF EMBODIMENTS

Particular embodiments of this invention are illustrated in detail below in conjunction with the accompanying drawing. It is to be understood that particular embodiments described hereby are provided to illustrate and explain this invention only, but are not intended to limit this invention.

Figure 1:
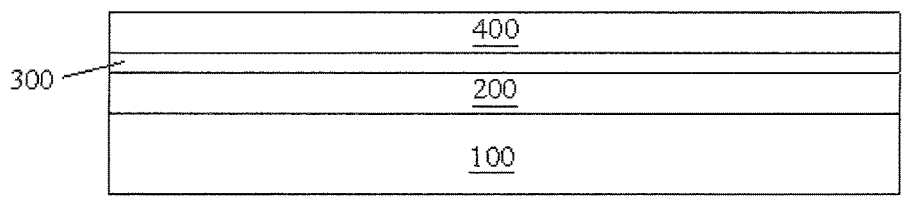
FIG. 1 is a sectional schematic diagram of an array substrate provided by this invention.

In an aspect of this invention, there is provided an array substrate. As shown in FIG. 1, the array substrate comprises a transparent substrate 100 and a first protective layer 200 attached on the transparent substrate 100, wherein the first protective layer 200 and the transparent substrate 100 satisfy the following relational expression, $0 \leq |C| \leq 1.0 \times 10^{-13}$, in which C is a comprehensive photoelastic coefficient, and is defined by the following equation (1):

$$C = \frac{C_{100}\rho_{100}d_{100}}{\rho_{100}d_{100} + \rho_{200}d_{200}} + \frac{C_{200}\rho_{200}d_{200}}{\rho_{100}d_{100} + \rho_{200}d_{200}} \quad (1)$$

in which $C_{100}$ is the photoelastic coefficient of the transparent substrate; and $C_{100}$ may have a first predetermined value;

$\rho_{100}$ is the density of the transparent substrate, and $\rho_{100}$ may have a second predetermined value;

$d_{100}$ is the thickness of the transparent substrate, and $d_{100}$ may have a third predetermined value;

$C_{200}$ is the photoelastic coefficient of the first protective layer;

$\rho_{200}$ is the density of the first protective layer; and $d_{200}$ is the thickness of the first protective layer.

Preferably, C=0.

It is to be noted that C=0 here is the most desirable circumstance. However, it may not achieve this desirable circumstance in industrial production. Therefore, in industrial production, practical requirements can be substantially satisfied as long as $|C| \leq 1.0 \times 10^{-13}$.

In the art, the following equation (2) is typically used to calculate the change rate of the photoelastic birefringence of an array substrate:

$$\Delta n_{ph} = C \times \sigma \quad (2)$$

wherein $\Delta n_{ph}$ is the change rate of the birefringence of the material;

C is the photoelastic coefficient of the array substrate; and

σ is the stress of the array substrate.

When the comprehensive photoelastic coefficient C of the array substrate shown in the equation (1) is zero, the photoelastic birefringence of the array substrate is zero, whether there is a stress inside the array substrate or not, and thus problems such as light leakage, etc., are solved. When C is not zero, as long as $|C| \leq 1.0 \times 10^{-13}$, although birefringence occurs under stress, the generated birefringence is close to zero and the generation of the phenomenon of light leakage which may result in problems will not be incurred, under a stress condition where an array substrate typically lies, and thus it is also possible to solve the problem of light leakage. Of course, it is a preferred embodiment to allow C to be zero.

When an array substrate is designed, the transparent substrate 100 is preliminarily selected by a designer, and thus the photoelastic coefficient $C_{100}$ of the transparent substrate, the density $\rho_{100}$ of the transparent substrate 100, and the thickness $d_{100}$ of the transparent substrate are known.

The density $\rho_{200}$ of the first protective layer 200 and the photoelastic coefficient $C_{200}$ of this first protective layer are both determined by the material of the first protective layer 200. That is, as long as the material of the first protective layer 200 is determined, the density $\rho_{200}$ of the first protective layer 200 and the photoelastic coefficient $C_{200}$ of this first protective layer can be determined.

From the above-mentioned relational expression, it is possible to obtain the relationship of the thickness $d_{200}$ of the first protective layer 200, the density $\rho_{200}$ of the first protective layer 200, and the photoelastic coefficient $C_{200}$ thereof. After the relationship of the three described above are obtained, an array substrate may be designed as follows.

S1: The photoelastic coefficient and the density of the existing material for producing the first protective layer 200 are used to calculate the thickness of the first protective layer produced from this material.

S2: Whether the thickness described above exceeds the predetermined value is judged, and it is indicated that the first protective layer is excessively thick if the predetermined value is exceeded. If the thickness described above is not excessively thick, the first protective layer having the thickness described above is produced with the material described above; and if the thickness described above is excessively thick, the thickness is required to be reduced by increasing the photoelastic coefficient of the first protective layer, and at this point, it is required to modify the existing material for producing the first protective layer to obtain a modified material.

S3: The photoelastic coefficient and the density of the modified material are used to calculate the thickness of the first protective layer produced from this modified material.

The three steps described above are repeated until a first protective layer having a thickness not exceeding the predetermined value is obtained, and thus the material of the first protective layer in the production of a polarizer is determined.

It will be easily understood that in this invention, the polarizer should when the function of polarizers in liquid crystal display apparatuses. Therefore, the polarizer should comprise a polarizing layer 300. The polarizing layer 300 is provided on a first protective layer 200. The first protective layer 200 has two main effects. One is preventing the generation of light leakage in cooperation with a transparent substrate 100, and the other one is performing waterproof protection on the polarizing layer 300. Furthermore, both the first protective layer 200 and the polarizing layer 300 are produced from organic materials, and the fastness of the attachment of the polarizing layer 300 may also be increased by first providing the first protective layer 200 on the transparent substrate 100.

In summary, when designing an array substrate provided by this invention, it is not required to consider the improvement of materials of other film layers (e.g., a polarizing layer 300, or a second protective layer 400 which will be mentioned below) in a polarizer, and it may be ensured that the change of photoelastic birefringence of a finally formed array substrate is zero (or close to zero) in the case that it is subjected to stress, as long as the thickness $d_{200}$ of a first protective layer 200 is adjusted or the material of the first protective layer is selected, such that the phenomenon of light leakage of a finally formed liquid crystal display panel generated due to photoelastic birefringence may be eliminated or reduced.

In this invention, the particular material of the transparent substrate 100 is not limited. For example, the transparent substrate 100 may be a glass substrate, or may be a substrate produced from another transparent material. It is to be understood by the person skilled in the art that all of the "first predetermined value", the "second predetermined value", and the "third predetermined value" described hereinbefore are preliminarily determined by a designer in the process of designing the array substrate. These values depend on the circumstance where the array substrate is applied and the condition of material suppliers, etc. That is, as for a designer, the predetermined values described above are known.

As described hereinbefore, the thickness range of the first protective layer 200 may be set when designing an array substrate. That is, in this invention, the thickness of the first protective layer 200 is not greater than a fourth predetermined value. After the fourth predetermined value is set, once Step S1 to Step S3 described hereinbefore are performed, the material of the first protective layer 200 may be produced by adjustment so as to obtain a first protective layer 200 having a thickness not greater than the fourth predetermined value. The material from which the first protective layer is produced is a mixture of a matrix material and an additive. A designer may select a matrix material and an additive, which have known photoelastic coefficients, and a material having a photoelastic coefficient $C_{200}$ and a density $\rho_{200}$ may be obtained by mixing both of them at a predetermined ratio.

In this invention, cellulose triacetate may be used as a matrix material. Accordingly, the additive may be selected from any one of methyl methacrylate, trifluoroethyl methacrylate, trichloroethyl methacrylate, benzyl methacrylate, trimethylcyclohexyl methacrylate, and pentafluorophenyl methacrylate.

Photoelastic coefficients of various glass substrates, materials of polarizing plate film layers, and additives described above are set forth in Table 1.

TABLE 1

| Material name | Abbreviation | Photoelastic coefficient $C$ $(\times 10^{-12}/Pa)$ |
|---|---|---|
| Glass | Glass | 3.0~3.3 |
| Cellulose triacetate | TAC | 12.0 |
|  | 0-TAC | 8.0 |
| Cycloolefin copolymer | COP | 2.0~7.0 |
| Methyl methacrylate | MMA | −5.5 |
| Trifluoroethyl methacrylate | TFEMA | −2.2 |
| Trichloroethyl methacrylate | TCEMA | −8.9 |
| Styrene | Pst | −55.0 |

In the process of producing a polarizing plate, a monomer having a negative photoelastic coefficient, such as a monomer listed in Table 1, is preferably used, but is not limited thereto this Table. Those having negative photoelastic coefficients, which may be used for modifying base materials of polarizing plate and are chemically or physically added to modify TAC, 0-TAC, COP, 0-COP, or the like, may be used for polymers of polarizing plate film materials. (This proposal is not only limited to TAC and COP polymers, but any film material, which may be used for polarizing plates, is suitable)

One of the birefringence of any matrix polymer is canceled by adding a photoelastic birefringence with an opposite sign.

In this invention, the transparent substrate 100 may have a thickness of 100 to 300 nm, the polarizer may have a thickness of 15 to 25 μm, and the first protective layer 200 may have a thickness of 65 to 85 nm. The transparent substrate may have a photoelastic coefficient of $(0.5-3)\times 10^{-12}$ Pa$^{-1}$. In a preferred embodiment of this invention, the transparent substrate has a photoelastic coefficient $C_{100}$ of $3.0\times 10^{-12}$ Pa$^{-1}$. Accordingly, the material of the polarizer may be typically polystyrene-modified TAC material or COP material, which has a photoelastic coefficient of $-9.1\times 10^{-12}$ Pa$^{-1}$. In that case, the transparent substrate 100 may have a thickness of 200 μm, the polarizer has a thickness of 15 to 25 μm, and protective layer has a thickness of 70.0 μm.

As described hereinbefore, in order to ensure the normal function of the polarizer, this polarizer comprises a polarizing layer 300. In order to protect the polarizing layer 300 from abrasion and prevent moisture from entering the polarizing layer 300, it is preferable that the polarizer may further comprise a second protective layer 400 and the polarizing layer 300 is sandwiched between the first protective layer 200 and the second protective layer 400. In this invention, the particular material of the polarizing layer 300 is not specifically limited. For example, the material of the polarizing layer 300 may be polystyrene-modified cellulose triacetate or cycloolefin copolymer.

In this invention, the material of the second protective layer 400 is not specifically limited, either. For example, the material of the second protective layer 400 may be the same as that of the first protective layer 200. Otherwise, the material of the second protective layer 400 may be a TAC material.

In another aspect of this invention, there is provided a display panel comprising an array substrate, which is the above-mentioned array substrate provided by this invention.

It will be easily understood that the display panel is a liquid crystal display panel.

Since the comprehensive photoelastic coefficient C of the array substrate is zero or nearly zero, even in the case that the display panel is subjected to the action of stress, the change of photoelastic birefringence is still close to zero, such that light leakage of the display panel may be greatly reduced.

The array substrate of the display panel as described hereinbefore may comprises a pixel circuit, and the pixel circuit is provided on a surface of the transparent substrate where the first protective layer is not provided. In other words, the first protective layer and the pixel circuit are provided respectively on both sides of the transparent substrate.

The pixel circuit described herein refers to a circuit on the array substrate used for achieving the function of display. The pixel circuit comprises a gate line, a data line, a thin film transistor, a common electrode line, a common electrode, and a pixel electrode. The mode for providing the pixel circuit is well known in the art, and verbose words are omitted herein.

As described hereinbefore, the array substrate may further comprise a color filter layer, and the color filter layer is provided on a surface of the transparent substrate where the first protective layer is not provided. In other words, the color filter layer and the first protective layer are provided respectively on both sides of the transparent substrate. The color filter layer comprises color filter blocks of three colors including red, green, and blue. Otherwise, the color filter layer may further comprise a color filter block of a fourth color besides red, green, and blue, and the fourth color may be yellow, cyan, etc. How to provide the color filter layer is well known in the art, and verbose words are omitted herein.

In yet another aspect of this invention, there is provided a display apparatus, which comprises a display panel, wherein the display panel is the above-mentioned display panel provided by this invention.

Since the comprehensive photoelastic coefficient of the array substrate is zero or nearly zero, the possibility of light leakage of the display apparatus is greatly reduced.

In this invention, the display apparatus may be an electronic device such as a cell phone, a desktop computer, a notebook computer, a tablet computer, a navigator, etc.

It can be understood that the above embodiments are merely exemplary embodiments used for illustrating the principle of this invention. However, this invention is not limited thereto. With respect to those of ordinary skill in the art, various variations and modifications can be made without departing from the spirit and the substance of this invention. These variations and modifications are also considered as the scope protected by this invention.

What is claimed is:

1. An array substrate comprising a transparent substrate and a polarizer which is attached on the transparent substrate and comprises a first protective layer in contact with the transparent substrate, wherein the first protective layer and the transparent substrate satisfy the following relational expression: $0 \leq |C| \leq 1.0\times 10^{-13}$ Pa$^{-1}$ in which C is a comprehensive photoelastic coefficient, and is defined by the following equation (1):

$$C = \frac{C_{100}\rho_{100}d_{100}}{\rho_{100}d_{100} + \rho_{200}d_{200}} + \frac{C_{200}\rho_{200}d_{200}}{\rho_{100}d_{100} + \rho_{200}d_{200}} \qquad (1)$$

in which $C_{100}$ is the photoelastic coefficient of the transparent substrate; $\rho_{100}$ is the density of the transparent substrate; $d_{100}$ is the thickness of the transparent substrate; $C_{200}$ is the photoelastic coefficient of the first protective layer; $\rho_{200}$ is the density of the first protective layer; and $d_{200}$ is the thickness of the first protective layer, wherein the material, from which the first protective layer is produced, is a mixture of a matrix material and an additive such that the photoelastic coefficient of the first protective layer satisfies the relational expression.

2. The array substrate according to claim 1, wherein the matrix material is cellulose triacetate or a cycloolefin copolymer, and the additive is any one of methyl methacrylate, trifluoroethyl methacrylate, trichloroethyl methacrylate, benzyl methacrylate, trim ethylcyclohexyl methacrylate, and pentafluorophenyl methacrylate.

3. The array substrate according to claim 1, wherein the transparent substrate has a photoelastic coefficient of $(0.5-3)\times 10^{-12}$ Pa$^{-1}$.

4. The array substrate according to claim 3, wherein the polarizer further comprises a second protective layer and a polarizing layer sandwiched between the first protective layer and the second protective layer, and the material of the polarizing layer is polystyrene-modified cellulose triacetate or a cycloolefin copolymer.

5. The array substrate according to claim 1, wherein the transparent substrate has a thickness of 100 to 300 μm, and the first protective layer has a thickness of 65 to 85 μm.

6. A display panel comprising an array substrate as claimed in claim 1.

7. The display panel according to claim 6, wherein the array substrate comprises a pixel circuit, and the pixel circuit is provided on a surface of the transparent substrate where the first protective layer is not provided.

8. The display panel according to claim 6, wherein the array substrate comprises a color filter layer, and the color filter layer is provided on a surface of the transparent substrate where the first protective layer is not provided.

9. A display apparatus comprising the display panel as claimed in claim 6.

10. A method for producing an array substrate comprising a transparent substrate and a polarizer attached on the transparent substrate, comprising: providing the transparent substrate, which has a photoelastic coefficient of C100, a density of ρ00, and a thickness of d100; providing the polarizer on the transparent substrate, wherein the polarizer comprises a first protective layer in contact with the transparent substrate, wherein a photoelastic coefficient $C_{200}$, a density ρ200, and a thickness $d_{200}$ of the first protective layer are set so as to satisfy a relational expression $0 \leq |C| \leq 1.0 \times 10^{-13}$ Pa$^{-1}$, in which C is a comprehensive photoelastic coefficient, and is defined by the following equation (1):

$$C = \frac{C_{100}\rho_{100}d_{100}}{\rho_{100}d_{100} + \rho_{200}d_{200}} + \frac{C_{200}\rho_{200}d_{200}}{\rho_{100}d_{100} + \rho_{200}d_{200}} \quad (1)$$

wherein the material, from which the first protective layer is produced, is a mixture of a matrix material and an additive, and the first protective layer having the determined photoelastic coefficient C200 and the density p200 is obtained by adjusting the composition of the mixture.

11. The method according to claim 10, wherein a material is designated to be used for the first protective layer, and the thickness $d_{200}$ of the first protective layer is calculated by the photoelastic coefficient $C_{200}$ and the density $\rho_{200}$ of the material according to the relational expression.

12. The method according to claim 10, wherein the thickness $d_{200}$ of the first protective layer is specified, and then the relationship between the photoelastic coefficient $C_{200}$ and the density $\rho_{200}$ of the first protective layer is calculated according to the relational expression with the specified thickness $d_{200}$, and a material meeting the relationship is used for the first protective layer.

13. The method according to claim 10, wherein the matrix material is cellulose triacetate or a cycloolefin copolymer, and the additive is any one of methyl methacrylate, trifluoroethyl methacrylate, trichloroethyl methacrylate, benzyl methacrylate, trimethylcyclohexyl methacrylate, and pentafluorophenyl methacrylate.

* * * * *